United States Patent [19]

Jenny

[11] Patent Number: 4,566,705
[45] Date of Patent: Jan. 28, 1986

[54] TOOL RETAINER HAVING AXIALLY AND RADIALLY MOVABLE CLAMPING MEMBERS

[75] Inventor: Werner Jenny, Münsingen, Fed. Rep. of Germany

[73] Assignee: TBT Tiefbohrtechnik GmbH & Co. KG, Dettingen, Fed. Rep. of Germany

[21] Appl. No.: 616,958

[22] Filed: Jun. 4, 1984

[30] Foreign Application Priority Data

Jun. 8, 1983 [DE] Fed. Rep. of Germany ....... 3320612

[51] Int. Cl.⁴ ............................................. B23B 31/30
[52] U.S. Cl. .......................................... 279/4; 279/20; 279/28
[58] Field of Search .................. 279/4, 20, 28; 408/59

[56] References Cited

U.S. PATENT DOCUMENTS

| | | | |
|---|---|---|---|
| 2,860,881 | 11/1958 | Perrachione | 279/4 |
| 3,072,416 | 1/1963 | Leifer | 279/4 |
| 3,451,314 | 6/1969 | Smrekar | 279/4 X |
| 3,490,333 | 1/1970 | Scruton | 279/4 X |
| 4,094,521 | 6/1978 | Piotrowski | 279/4 |

Primary Examiner—Fred Silverberg
Attorney, Agent, or Firm—Peter K. Kontler

[57] ABSTRACT

The drill spindle of a deep well drilling machine has a sleeve-like extension with a conical internal surface which is complementary to conical external surfaces on an annulus of claws forming part of a clamping device which is inserted into the extension and has an axial passage for the shank of a rotary tool. A set of dished springs normally urges a ring against a conical end face of the clamping device whereby the latter urges its claws against the internal surface of the extension and the claws transmit torque from the spindle to the shank of the tool. If the transmission of torque is to be terminated, the piston of a fluid-operated motor is caused to shift the ring against the opposition of the dished springs whereby the claws relax the force with which they engage the shank and the latter can be extracted from the passage of the clamping device.

17 Claims, 1 Drawing Figure

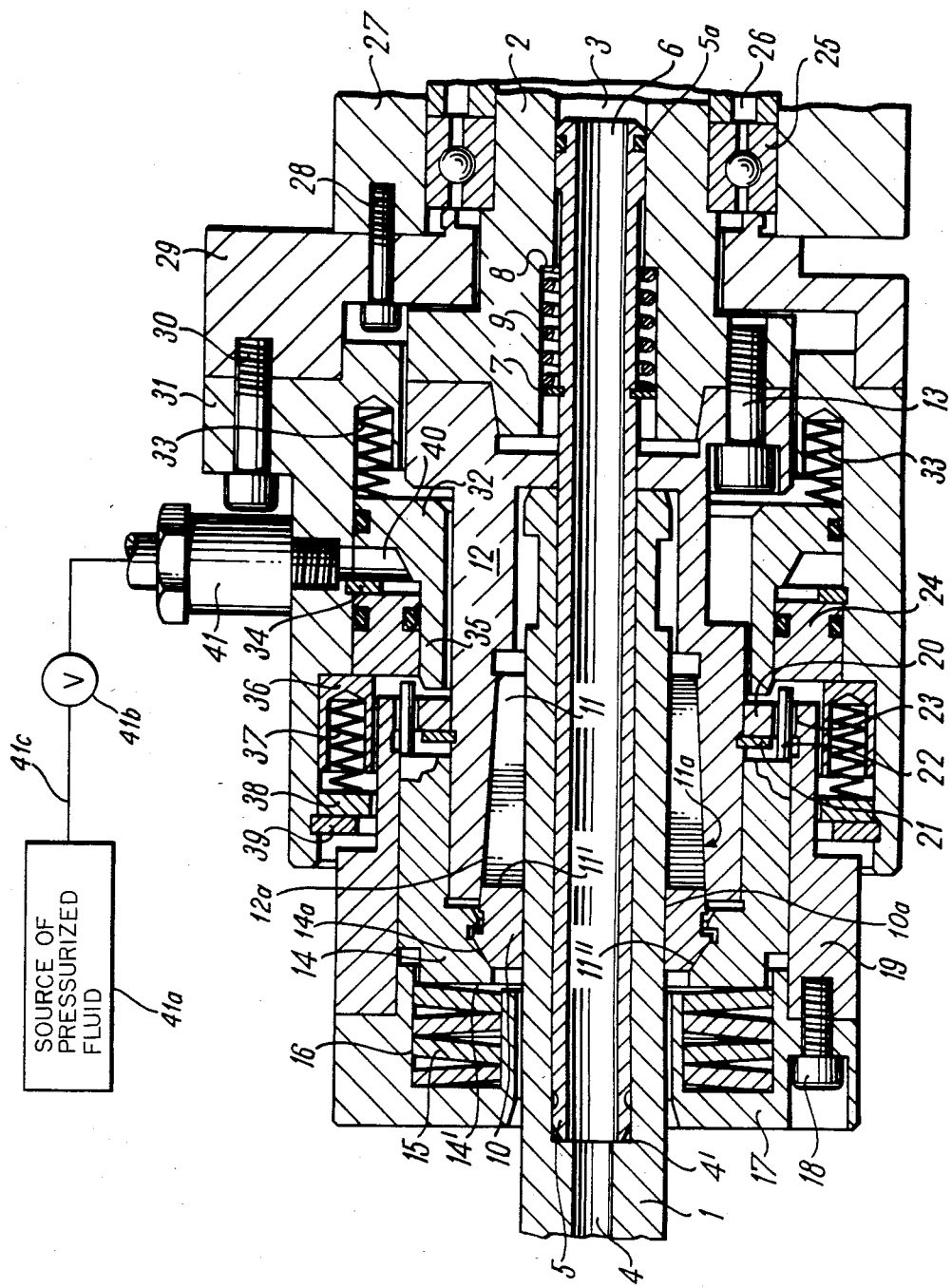

TOOL RETAINER HAVING AXIALLY AND RADIALLY MOVABLE CLAMPING MEMBERS

BACKGROUND OF THE INVENTION

The present invention relates to apparatus for releasably holding portions of tools or the like, and more particularly to improvements in chucks and analogous apparatus for releasably holding the shanks of rotary parts, such as for releasably securing the shank of a boring or drilling tool to a rotary drill spindle or an analogous rotary member.

It is already known to releasably secure the shank of a rotary tool to a spindle or another driven rotary member by providing or connecting the rotary member with a sleeve-like portion having a conical internal surface and by inserting the shank of the tool into the axial passage of a clamping device having radially movable prongs with conical external surfaces which are complementary to and slidable along the internal surface of the sleevelike portion. If the clamping device is moved axially in one direction, the prongs are caused to move radially inwardly and to clamp the shank to thus establish a torque transmitting connection between the rotary member and the tool. As a rule, the clamping device is moved in the one direction by hand, e.g., by rotating a nut which mates with the enclosure for the clamping device, or by effecting axial movements of pull rods which extend rearwardly of the shank and can be moved axially in the region of the rotary member. The pull rods must be installed in an axial bore of the rotary member which presents many problems, especially if the rotary member is a drill spindle which should transmit torque to a deep well drilling tool. This will be readily appreciated by bearing in mind that a drill spindle is further supposed to provide one or more paths for the flow of lubricating and/or cooling media to and from the locus of penetration of the working end of the tool into the material to be provided with a bore. If the pull rods are installed in the interior of the drill spindle, the dimensions of the latter must be increased or its strength must be reduced if the bore or bores of such rotary member are to provide room for the pull rods as well as for the flow of cooling and/or lubricating media.

OBJECTS AND SUMMARY OF THE INVENTION

An object of the invention is to provide a novel and improved apparatus for releasably holding the shank of a tool or the like for reception of torque from a rotary member without unduly weakening the rotary member and without resorting to nuts and/or pull rods.

Another object of the invention is to provide a novel and improved chuck for the shank of a deep well drilling tool or the like.

A further object of the invention is to provide a chuck which is constructed and assembled in such a way that the shank of a rotary tool or the like is automatically coupled to and can receive torque from a drill spindle or another rotary member until and unless the operator in charge wishes to interrupt the torque transmitting connection.

An additional object of the invention is to provide a simple, reliable, compact and inexpensive apparatus for releasably holding the shank of a rotary tool or the like in torque-receiving engagement with a rotary driven member.

Still another object of the invention is to provide a chuck wherein the connection between the torque transmitting and torque receiving parts can be established or terminated with little loss in time.

Another object of the invention is to provide a chuck which can be used with advantage as a superior substitute for heretofore known chucks in deep well drilling and many other machines.

A further object of the invention is to provide a novel and improved method of establishing and/or terminating the torque transmitting connection between a drill spindle and the shank of a deep well drilling tool.

Still another object of the invention is to provide novel and improved means for disengaging the shank of a rotary tool from the means which transmits torque thereto.

The invention is embodied in an apparatus for releasably holding the shank of a tool or the like. The apparatus comprises a rotary member (e.g., a driven drill spindle if the tool is a deep well drilling tool) including a substantially sleeve-like portion having a conical internal surface, a clamping device having a shank-receiving axial passage and a plurality of substantially radially movable claws or jaws which surround at least a portion of the passage and have conical external surfaces complementary to and adjacent to the internal surface of the sleeve-like portion, resilient means (e.g., a package of dished springs) for urging the clamping device axially in a first direction to thereby bias the claws against the shank in the passage through the medium of the internal surface of the sleeve-like portion, and fluid-operated motor means which is actuatable to move or to effect a movement of the clamping device in a second direction counter to the first direction and to thereby relax the bias of the claws upon the shank in the passage of the clamping device. The apparatus can further comprise a ring or other suitable (preferably annular) motion transmitting means which is interposed between the resilient means and the clamping device. Such ring can include a first section which surrounds a portion of the clamping device and a second section which surrounds at least a certain part of the sleeve-like portion. The first section is preferably formed with a first conical end face and the aforementioned portion of the clamping device is then formed with a second conical end face which is adjacent and at least substantially complementary to the first end face to receive motion from the latter and to move the claws in the first direction under the action of the resilient means. In other words, when the motor means is not actuated, the resilient means causes the first section of the ring to urge its end face against the end face of the clamping device whereby the latter is shifted or tends to move in the first direction in order to enable the conical internal surface of the sleeve-like portion of the rotary member to bias the claws against the periphery of the shank in the passage of the clamping device.

The just described apparatus preferably further comprises an enclosure for the resilient means and the motion transmitting ring, and such enclosure is preferably formed with an internal compartment for the resilient means and can include a cover defining the just mentioned compartment, a shell which surrounds the motion transmitting ring, and screws or other suitable means for securing the shell to the cover. The sleeve-like portion of the rotary member can be provided with abutment means (e.g., in the form of a split ring which is removably secured to the sleeve-like portion), and the resilient means is preferably arranged to react against the cover and to urge the shell against the abutment means of the sleeve-like portion. The motor means preferably comprises an output element (e.g., a reciprocable annular piston) which is movable in the second direction to thereby move the motion transmitting ring in the second direction against the opposition of the resilient means and to thus allow for movement of the clamping device in the second direction. To this end, the shell can be provided with at least one opening for a projection which is provided on or affixed to the motion transmitting ring and extends through the opening and into the path of movement of the output element in the second direction. The motor means preferably comprises a source of pressurized fluid (e.g., oil), a cylinder wherein the piston is reciprocable in the first and second directions, and means for admitting into the cylinder pressurized fluid from the source to thereby move the piston in the second direction. The projection or projections of the motion transmitting ring can constitute studs which extend in parallelism with the axis of the rotary member.

The aforementioned piston can constitute one of two pistons in the chamber of the cylinder forming part of the fluid-operated motor means. For example, the cylinder and the second piston can be bolted, screwed or otherwise secured to a housing for the rotary member, and the first piston can be mounted on a smaller diameter hub of the second piston. When the pressurized fluid is admitted into the space between the two pistons, the first piston is caused to move axially in the second direction in order to relax the bias of the motion transmitting ring upon the clamping device. The first piston can be installed in such position that it spacedly surrounds the sleeve-like portion of the rotary member, and the motor means can further comprise additional resilient means (e.g., one or more prestressed coil springs) for biasing the first piston in the first direction, i.e., for enabling the first mentioned resilient means to maintain the claws of the clamping device in pronounced torque-transmitting engagement with the shank in the passage of the clamping device.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary axial sectional view of an apparatus for releasably holding the shank of a rotary tool in torque receiving engagement with the sleeve-like portion of a drill spindle, the fluid-operated motor means being shown in deactivated condition so that the resilient means is free to maintain the claws of the clamping device in pronounced torque-transmitting engagement with the periphery of the shank in the axial passage of the clamping device.

DESCRIPTION OF THE PREFERRED EMBODIMENTS

The apparatus which is shown in the drawing comprises a rotary member 2 which is a hollow drill spindle having an integral or separable sleeve-like front end portion or extension 12 with a conical internal surface 12a which flares outwardly in a direction to the left, as viewed in the drawing. In the illustrated embodiment, the sleeve-like portion 12 (hereinafter called sleeve for short) is separably secured to the remaining portion of the spindle 2 by a set of screws 13 (only one shown).

The tool which is to receive torque from the spindle 2 comprises a shank 1 which has an axial bore 4 and is inserted into an axial passage 10a provided in an annular clamping device 10 resembling a tongs and having a set of radially movable claws or prongs 11 with conical external surfaces 11a which are complementary and adjacent to the internal surface 12a of the sleeve 12. The left-hand portion of the clamping device 10 is a solid annulus and the neighboring claws 11 are separated from one another by relatively narrow slots or gaps 11' which extend to the right-hand end face of the solid annular portion of the device 10. The axial bore 4 of the shank 1 serves for admission of coolant and/or lubricant to and/or for evacuation of coolant and/or lubricant from the locus of penetration of the working end of the tool into the material which is to be formed with a hole or bore.

The spindle 2 is driven by a suitable prime mover which is not specifically shown in the drawing. Its axial bore 3 receives a sealing pipe 5 having an axial bore 6 in communication with the bore 4 of the shank 1. The bore 6 establishes a path for the flow of a cooling and/or lubricating medium between the bores 3 and 4. An intermediate portion of the sealing pipe 5 is formed with a circumferential groove for a split ring 7 which is acted upon by a coil spring 9. This spring reacts against an internal annular shoulder 8 of the spindle 2 and urges the left-hand end face of the pipe 5 against an internal annular shoulder 4' of the shank 1 in the axial passage 10a of the clamping device 10. The righthand end portion of the sealing pipe 5 carries an O-ring 5a in sealing engagement with the internal surface of the spindle 2. This O-ring cooperates with the left-hand end face of the pipe 5 to prevent leakage of coolant and/or lubricant from the path which is defined by the registering bores 3, 6 and 4.

The screws 13 ensure that the sleeve 12 shares all angular movements of the spindle 2, and, when the conical internal surface 12a of the sleeve 12 compels the claws 11 of the clamping device 10 to bear against the peripheral surface of the shank 1 in the passage 10a, the sleeve 2 rotates the shank 1 through the medium of the clamping device 10. The apparatus of the present invention is designed to normally transmit torque between the spindle 2 and the shank 1. To this end, the apparatus further comprises resilient means in the form of a package of dished springs 15 which react against the cover 17 of a composite enclosure for the springs 15 and a ring-shaped motion transmitting member 14 (hereinafter called ring). The springs 15 urge the ring 14 in a (first) direction to the right, as viewed in the drawing, whereby the ring 14 biases the clamping device 10 in the same direction so that the conical internal surface 12a can urge the claws 11 radially inwardly and into strong torque-transmitting engagement with the shank 1 in the passage 10a. If the clamping device 10 is free to move in the opposite (second) direction, namely to the left, as viewed in the drawing, the bias of the claws 11 upon the shank 1 is terminated or relaxed so that the spindle 2 ceases to rotate the tool and the shank 1 can be extracted from the passage 10a.

The solid annular portion of the clamping device 10 has a conical front end face 11" which is complementary to and abuts against a conical end face 14a in the left-hand end portion of the ring 14. When the dished springs 15 are free to dissipate energy, the end face 14a bears against the end face 11" and moves the clamping device 10 in a direction to the right to thereby establish a reliable torque-transmitting connection between the spindle 2 and the shank 1. The rightmost dished spring 15 bears against the front end face 14' of the ring 14, and the package of dished springs is installed in an internal compartment 16 of the cover 17. The enclosure for the springs 15 and ring 14 further includes a cylindrical shell 19 which surrounds the ring 14 and is separably affixed to the cover 17 by a set of screws 18 or other suitable securing means.

The right-hand end portion of the shell 19 has an inwardly extending annular collar 20 which is formed with a set of equidistant axially parallel openings 23 for axially parallel studs or analogous projections 22 provided on and extending from the right-hand end face of the ring 14. The collar 20 is biased against an external abutment 21 of the sleeve 12; this abutment is a split ring which is recessed into a circumferential groove of the sleeve 12 to the left of the collar 20. The springs 15 react against the cover 17 and tend to move the shell 19 in a direction to the left, as viewed in the drawing, whereby the collar 20 bears against the abutment 21. As mentioned above, the springs 15 normally bear against the ring 14 to urge the latter's internal conical end face 14a against the conical end face 11" of the clamping device 10 so that the claws 11 are urged against the conical internal surface 12a of the sleeve 12 and bear against the periphery of the shank 1 in the axial passage 10a of the clamping device.

The right-hand end portions of the studs 22 extend only slightly beyond the right-hand end face of the collar 20 when the claws 11 are caused to bear against and to transmit torque to the shank 1. For example, the length of those portions of the studs 22 which normally extend beyond the respective openings 23 in the collar 20 need not exceed 5 millimeters. Such studs are located in the path of leftward movement of an annular output element 24 constituting one of two reciprocable pistons of a fluid-operated motor which, in accordance with a feature of the present invention, is activatable to interrupt the torque transmitting connection between the spindle 2 and the shank 1. When the piston 24 is caused to move in a (second) direction to the left, as viewed in the drawing, it shifts the ring 14 axially through the medium of the studs 22 so that the springs 15 are caused to store energy and the clamping device 10 is free to move in a direction to the left in order to relax the force with which the claws 11 grip the periphery of the shank 1. This suffices to terminate the torque-transmitting connection between the spindle 2 and the shank 1 as well as to permit extraction of the shank from the axial passage 10a of the clamping device 10.

The fluid-operated motor which can cause the springs 15 to store energy further comprises a stationary cylinder 31 which defines an annular chamber 40 around the periphery of the sleeve 12 and is affixed to a stationary flange 29 by one or more screws 30 or other suitable fasteners. The flange 29 is attached to a stationary housing 27 by screws 28 and the housing 27 contains antifriction and/or other types of bearings 25, 26 for the spindle 2. The chamber 40 has larger- and smaller-diameter portions, and a smaller-diameter portion thereof contains the aforementioned annular piston 24 as well as a second annular piston 32 having a smaller-diameter hub 35 for the piston 24. The piston 32 is biased in a direction to the left by one or more coil springs 33 which are recessed into axially parallel sockets of the cylinder 31 and urge the piston 32 toward a split ring 34 which is recessed into a groove machined into the internal surface of the cylinder 31. The coil springs 33 hold the piston 32 against rotation relative to the cylinder 31 which latter is held against rotation relative to the housing 27 by the flange 29 and screws 28 and 30.

The motor further comprises a suitable source 41a of pressurized fluid (e.g., oil) and a nipple 41 which serves as a means for admitting pressurized fluid into the chamber 40 between the pistons 24 and 32 when the operator or an automatic device opens a valve 41b in the conduit 41c connecting the source 41a with the nipple 41. Admission of pressurized fluid into the cylinder chamber 40 between the pistons 24, 32 entails a movement of the piston 32 against the opposition of the coil springs 33 and a movement of the piston 24 against the studs 22 of the ring 14. At such time, the piston 24 must overcome the resistance of one or more coil springs 37 which tend to urge this piston against the split ring 34 in the chamber 40 of the cylinder 31. Each coil spring 37 reacts against a retaining ring 38 which abuts against a split ring 39 in the left-hand end portion of the cylinder 31, and each coil spring 37 bears against a ring 36 which, in turn, abuts against the left-hand end face of the piston 24 and can yield against the opposition of the spring or springs 37 when the valve 41b admits pressurized fluid into the chamber 40 between the pistons 24 and 32.

When the valve 41b is caused to open, the piston 24 automatically shifts the ring 14 by way of the studs 22 and causes the dished springs 15 to store energy with the result that the conical end face 14a of the ring 14 ceases to bear against the conical end face 11" of the clamping device 10 which allows its claws 11 to relax the grip upon the shank 1 and to thus interrupt the transmission of torque from the spindle 2 to the tool including the shank 1. Also, the shank 1 is then ready to be extracted from the passage 10a of the clamping device 10. The torque-transmitting connection between the sleeve 2 and the illustrated shank 1 or the shank of a freshly inserted tool is established in immediate response to closing of the valve 41b and resulting reduction of pressure of fluid in the chamber 40. For example, such fluid is then permitted to flow into a sump wherein the pressure matches atmospheric pressure so that the spring or springs 37 are free to expand and to move the piston 24 in a direction to the right, as viewed in the drawing. This disengages the piston 24 from the studs 22 of the ring 14 whereby the springs 15 are again free to move the ring 14 in a direction to the right and to establish a torque-transmitting connection between the claws 11 and the shank 1 in the passage 10a.

An important advantage of the improved apparatus is that the application of clamping force to the shank 1 can be interrupted or terminated automatically by the simple expedient of effecting an appropriate adjustment of the valve 41b. Another important advantage of the improved apparatus is that the clamping device 10 need not be shifted axially by pull rods or like devices which would take up space in the interior of the spindle 2. A further important advantage of the improved apparatus is that the shank 1 is normally clamped and thus shares the angular movements of the spindle 2, i.e., that it is necessary to intentionally interrupt the torque-transmitting connection between the spindle and the tool if such interruption is desired or necessary.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for releasably holding the tubular shank of a drilling tool, comprising a stationary housing; a rotary member mounted in said housing and including a substantially sleeve-like portion having a conical internal surface; a clamping device movable axially of said rotary member and having a shank-receiving axial passage and a plurality of substantially radially movable surclaws surrounding at least a portion of said passage and having conical external surfaces complementary to and adjacent to said internal surface, said rotary member having an axial bore in communication with the interior of the tubular shank in said clamping device; resilient means for urging said clamping device axially in a first direction to thereby bias said claws against the tubular shank in said passage through the medium of said internal surface; a separate axially movable motion transmitting means interposed between said resilient means and said clamping device to move said clamping device axially of said rotary member under the action of said resilient means; and fluid-operated motor means actuatable to move said clamping device in a second direction counter to said first direction through the medium of said motion transmitting means and to thereby relax the bias of said claws upon the tubular shank in said passage, said motor means comprising a cylinder fixedly attached to said housing.

2. The apparatus of claim 1, wherein said motion transmitting means comprises a ring including a section surrounding a portion of said clamping device and having a first conical end face, said portion of said clamping device having a second conical end face adjacent and at least substantially complementary to said first conical end face and arranged to receive motion from the latter to move said claws in said first direction under the action of said resilient means.

3. The apparatus of claim 2, wherein said ring of said motion transmitting means comprises a second section at least partially surrounding said sleeve-like portion.

4. The apparatus of claim 2, further comprising an enclosure for said resilient means and said ring, said enclosure having an internal compartment for said resilient means and including a cover member defining said compartment, a shell surrounding said ring and means for securing said shell to said cover member.

5. The apparatus of claim 4, wherein said sleeve-like portion comprises abutment means and said resilient means is arranged to react against said cover member to thereby urge said shell against said abutment means, said motor means further including an output element movable in said cylinder in said second direction to thereby move said ring in said second direction against the opposition of said resilient means and to thus allow for movement of said clamping device in said second direction.

6. The apparatus of claim 5, wherein said shell has at least one opening and said ring has a projection extending through said opening and into the path of movement of said output element in said second direction.

7. The apparatus of claim 6, wherein said output element includes a piston which is reciprocable in said first and second directions, said motor means further comprising a source of pressurized fluid and means for admitting into said cylinder pressurized fluid from said source to thereby move said piston in said second direction.

8. The apparatus of claim 6, wherein said projection includes a stud which is at least substantially parallel to the axis of said rotary member.

9. The apparatus of claim 1, wherein said cylinder defines a chamber and said motor means further comprises a source of pressurized fluid, a first piston disposed in said cylinder and having an annular hub surrounding said rotary member, a second piston reciprocably installed in said chamber and surrounding said hub, and means for admitting pressurized fluid from said source into said cylinder between said pistons to thereby move said second piston in said second direction, said motion transmitting means including at least one projection extending into the path of movement of said second piston in said second direction.

10. The apparatus of claim 9, wherein said first piston surrounds said sleeve-like portion.

11. The apparatus of claim 9, further comprising means for holding said first piston against rotation with said rotary member.

12. The apparatus of claim 9, further comprising resilient means for yieldably biasing said second piston in said first direction.

13. The apparatus of claim 1, wherein said resilient means comprises a package of dished springs.

14. The apparatus of claim 1, wherein said rotary member includes a drill spindle.

15. The apparatus of claim 1, further comprising means for securing said cylinder to said housing.

16. The apparatus of claim 15, wherein said motor means further comprises a piston which is reciprocable in said cylinder in said first and second directions, spring means for biasing said piston in said first direction, a source of pressurized fluid, and means for admitting pressurized fluid into said cylinder to thereby move said piston in said second direction, said motion transmitting means including at least one portion extending into the path of movement of said piston in said second direction.

17. The apparatus of claim 1, further comprising a tubular member in the axial bore of said rotary member and sealing means interposed between said tubular member and said rotary member, said tubular shank having a stop and said tubular member having an end face adjacent to said stop, and further comprising means for biasing said end face against said stop.

* * * * *